United States Patent [19]

Morin et al.

[11] Patent Number: 5,432,625
[45] Date of Patent: Jul. 11, 1995

[54] DISPLAY SCREEN HAVING OPAQUE CONDUCTIVE OPTICAL MASK AND TFT OF SEMICONDUCTIVE, INSULATING, AND CONDUCTIVE LAYERS ON FIRST TRANSPARENT CONDUCTIVE FILM

[75] Inventors: François Morin; Michel Le Contellec, both of Lannion, France

[73] Assignee: France Telecom Etablissement Autonome de Droit Public, Paris, France

[21] Appl. No.: 34,851

[22] Filed: Mar. 19, 1993

[30] Foreign Application Priority Data

Mar. 30, 1992 [FR] France .................. 92 03809

[51] Int. Cl.⁶ .................. G02F 1/1343; G02F 1/1335
[52] U.S. Cl. ........................................ 359/59; 359/67
[58] Field of Search ................................ 359/59, 67

[56] References Cited

U.S. PATENT DOCUMENTS

| | | | |
|---|---|---|---|
| 4,753,518 | 6/1988 | Clerc | 359/59 |
| 4,834,505 | 5/1989 | Migliorato et al. | 359/59 |
| 5,130,829 | 7/1992 | Shannon | 359/67 |
| 5,162,933 | 11/1992 | Kakuda et al. | 359/67 |
| 5,238,861 | 8/1993 | Morin et al. | 437/51 |

FOREIGN PATENT DOCUMENTS

| | | |
|---|---|---|
| 0136509 | 4/1985 | European Pat. Off. . |
| 0179915 | 5/1986 | European Pat. Off. . |
| 0271313 | 6/1988 | European Pat. Off. . |
| 0450941 | 10/1991 | European Pat. Off. . |

OTHER PUBLICATIONS

Patent Abstracts of Japan, vol. 10, No. 68 (P-437) (2125), Mar. 18, 1986, JP-A-60 207 116, Oct. 18, 1985.

*Primary Examiner*—Anita Pellman Gross
*Attorney, Agent, or Firm*—Oblon, Spivak, McClelland, Maier, & Neustadt

[57] ABSTRACT

A display screen having an optical mask and a process for producing the screen. The screen includes an optical mask formed of opaque conducting rows formed below addressing rows. Storage capacitors are formed overlapping the opaque conducting rows with an array of electrodes. The invention finds particular utility in the field of displays.

12 Claims, 5 Drawing Sheets

DISPLAY SCREEN HAVING OPAQUE CONDUCTIVE OPTICAL MASK AND TFT OF SEMICONDUCTIVE, INSULATING, AND CONDUCTIVE LAYERS ON FIRST TRANSPARENT CONDUCTIVE FILM

BACKGROUND OF THE INVENTION

1. Field of the Invention

The present invention relates to a display screen having an optical mask and to a process for producing said screen.

It is used in the production of display screens intended to operate under severe conditions, i.e. intense lighting and high temperatures. The screen according to the invention can be used for television sets, computers, vehicle dashboards and instrument panels (cars, aircraft,etc.).

2. Description of the Prior Art

A display screen essentially comprises two transparent plates holding between them an electro-optical material and in particular a liquid crystal. FIGS. 1 and 2 show constructional examples of such plates.

FIG. 1 shows a transparent, e.g. glass substrate 10 covered by a group of conducting addressing columns 12, e.g. of indium and tin oxide (ITO), an array of electrodes 14, each of which constitutes a display point or pixels and a group of addressing rows 16 generally constituted by a stack of layers, namely a semiconductor layer (e.g. of aSi:H), an insulating layer (e.g. of SiN) and a conducting layer (e.g. of aluminium).

The columns 12 are extended by a crook 18 and the electrodes 14 by a finger 20, so that these various appendages and the column form the source and the drain of a double thin film transistor (TFT), the two gates being constituted by the metal layer of the addressing row.

FIG. 2 shows a second plate with a second transparent substrate 30 (e.g. of glass), blocks 32 of coloured filters (red, green, blue) a black matrix 34 and a conductive, transparent counterelectrode 36. The coloured filters 32 and the black matrix 34 are not essential in the invention to be described hereinafter, but would still be useful.

A screen of this type, or at least the first plate illustrated in FIG. 1, can be produced by a process only requiring two photolithography levels, as described in FR-A-2 533 072.

To ensure that an excessively intense illumination does not disturb the operation of the transistors, it is known to place an optical mask beneath each of them. Such a solution is e.g. described by the article of TOMISHISA SUNATA et al entitled "A Large-Area High-Resolution Active-Matrix Color LCD Addressed by a-Si TFT's", published in the journal "Proceedings of the Society for Information Display (SID)", 27, 1986, no.3, pp.229–233.

However, this mask, which is generally constituted by an opaque metal layer, has the effect of creating a parasitic transistor below the transistor to be protected. If the mask is at a floating potential, it can rise by influence to a positive potential and lead to leakage currents, which are prejudicial to the operation of the screen.

Consideration has been given to connecting such a mask to one of the transistor electrodes in order to fix the potential thereof. This is what is e.g. proposed in EP-A-179 915. The structure used is shown in FIG. 3. On a glass substrate 40 there is a mask 42 connected to an addressing column 43, everything being covered by an insulator 44. On said insulator 44 there is metal electrode 46 defining the pixel, said electrode being extended by a segment 47 serving as a drain. Moreover, there is a semiconductor 48 and a metal layer 50 serving as the source. An opening 82 is made in the insulator 44 for connecting the mask 42 to the source 50. The transistor is completed by an insulating layer 54 and by a metal gate or grid 56.

However, this device suffers from a disadvantage. Thus, liquid crystal screens are always excited in alternating manner. Thus, what serves as the transistor source in one frame serves as its drain in the other. Therefore the transistors of a screen of the type described hereinbefore will necessarily function with a zero gate—drain voltage in one of the frames. The current—voltage characteristic will then be of the diode type and if the voltage between the source and the drain exceeds a threshold voltage, the current will become very high.

FIGS. 4 and 5 provide a better understanding of this disadvantage of the prior art. FIG. 4 shows an electric diagram with a main transistor T1 and a parasitic transistor T2 created by the optical mask 42. The points A and B mark the zones corresponding alternately to the source and the drain of the transistor, as a function of the frame displayed.

Part a of FIG. 5 shows the source—drain current characteristic ($I_{SD}$) as a function of the source—drain voltage ($V_{SD}$) for a zero gate—source voltage ($V_{GS}$) and namely for the parasitic transistor T2 during one frame. In part b of FIG. 5 it is possible to see the same characteristic for a zero gate—drain voltage $V_{GD}$, which takes place for the following frame. This part b consequently shows that the source—drain current $I_{SD}$ can become very high.

Thus, in summarizing, for a negative frame the voltage $V_o$ applied to the addressing column is negative. If the voltage at A is below the voltage at B, A constitutes the source of the transistor T1 and the parasitic transistor T2 functions with a zero gate —source voltage ($V_{GS}$), whereas the source—drain current $I_{SD}$ is low, no matter what the source—drain voltage ($V_{SD}$) (part a of FIG. 5). For a positive frame the voltage $V_o$ is positive. If the voltage at A exceeds the voltage at B, point A corresponds to the drain. The parasitic transistor T2 functions at VGD=0. The current $I_{SD}$ can be high if $V_{SD}$ exceeds a threshold (part b of FIG. 5).

Therefore the prior art solution leads to the disadvantage of causing a leakage current in one of the two frames.

EP-A-136 509 proposes another solution, which consists of introducing below the thin film transistors an optical mask, which can partly pass beneath the pixel. The leakage current in the transistor is reduced and a supplementary storage capacity is formed.

This document stipulates that the optical mask must be located below the columns of the matrix (as well as below the TFT's and partly below the pixels). In this configuration, the time constant of the columns becomes non-negligible compared with the addressing time, which leads to a distortion of the video signal between individual screen points. Therefore this configuration can only be envisaged for small screens.

In this connection it is possible to calculate the delay introduced at the end of the column. The time constant of the end of the column is approximately $t' = RC/2$, if R is the total resistance of the column and C is total capacity. We obtain $R=(r \cdot L)/(d \cdot w)$ with r=resistivity, L=length, d=thickness and w=width.

Moreover, we have $C=Cmo+Cx+Ccl$ with Cmo being the column/optical mask capacity, Cx the row/column intersection capacity, Ccl the liquid crystal capacity (column/counterelectrode), $$Cmo=(e_i \cdot w \cdot L)/d_i, \quad Cx=N \cdot (e_j \cdot w \cdot w)/d_j,$$
$$Ccl=(e_k \cdot w \cdot L)/d_k,$$

with e and d respectively being the dielectric constant and thickness of the insulators (i, j and k representing the insulator of the optical mask, an intersection and the liquid crystal).

It can easily be seen that $Cmo/Ccl>10$, because $d_k=5$ microns and $d_i=0.5$ micron and $e_i$ differs only slightly from $e_k$. Moreover, generally Ccl differs only slightly from Cx.

Thus, if without an optical mask the column has a capacity of 2 (in arbitrary units), it will be 12 with the optical mask (in unity measurements). Therefore, the corresponding time constant will be six times higher. It can therefore be concluded that the column limit length is six times smaller in this case. This limit length is that for which the column delay becomes incompatible with, the addressing time.

In the aforementioned document, it is possible to see in the drawings, that the material constituting the column and the pixel is conductive and transparent ITO. With an ITO of square resistance 10 Ohms, the limit length is approximately 25 cm without an optical mask below the columns. It will be less than 5 cm on placing an optical mask below the columns.

SUMMARY OF THE INVENTION

The present invention aims at obviating all these disadvantages. It therefore recommends a mask which has the same number of opaque conducting rows as there are addressing rows, all the conducting rows being joined to one another and connected to a contact able to raise the optical mask to a reference potential. These opaque conducting rows are placed on the substrate and below the addressing rows and are covered by a dielectric, transparent insulating layer.

In an advantageous variant, the opaque conducting rows of the optical mask also have a width exceeding the width of the addressing rows and in part pass below the electrodes. The overlap part of an electrode with a row of the optical mask constitutes, with the dielectric covering said mask row, a storage capacitor associated with said electrode.

Therefore the present invention offers the same intrinsic advantages as that of EP-A-136 509 (namely a better behaviour under illumination by reducing the photocurrent in the TFT and better thermal behaviour due to the storage capacity), but does not have the disadvantages thereof. Thus, in the invention, it is the rows which undergo a capacity increase as a result of the optical mask. The columns are made from a relatively resistive material (ITO), whereas the rows are made from a very good conducting material, e.g. aluminium. The "row" time constant remains, under these conditions, at an acceptable level, even in large screens. In the present invention the "column" time constant remains approximately identical to that when no optical mask is used.

The display screen according to the invention can be produced in a simple manner and only requires one supplementally photolithography level compared with the known solution having two masking levels described in FR-A-2 533 072.

The present invention therefore also relates to a process for producing a display screen, wherein, on a first substrate, is deposited a thin opaque conductive material film, which is etched in accordance with a pattern constituted by rows of length and width at least equal to the future addressing rows, a transparent, dielectric insulating film is deposited thereon and the operations are continued as in the process having two photolithography levels in order to obtain the addressing columns, the electrodes, the addressing rows, the latter being superimposed on the rows of the optical mask.

Preferably, the first pattern is etched in order to form slightly wider opaque rows than the future addressing rows.

An ancillary advantage of the present invention is a reduction of the cost of the plate containing the coloured filters.

It is known that in order to have a good contrast, a screen must have a black matrix around each coloured point. In order to obtain such a matrix, it is generally necessary to use photolithography methods, which leads to a high cost for the plate supporting the coloured filters.

Less costly procedures can be used, but they generally lead to reduced performance characteristics. For example, printing men, hods are very attractive, but it is only possible to produce strip-like patterns as a result of the edge effects. Therefore a precise orthogonal matrix is excluded.

However, if the present invention is used for producing the plate containing the TFT array, half of the black matrix is already produced on the TFT support plate as a result of the horizontal optical mask. On the opposite plate, which supports the coloured filters, it is then merely necessary to produce black vertical strips in order to obtain, by superimposing, the complete black matrix. These black strips to be produced on the coloured plate would, in this case, be parallel to the red, green and blue strips of the filters. This simplified structure is now easily produced by offset printing. Therefore the cost of producing the coloured plate is reduced.

In the case where the optical mask is constituted by strips placed below the columns and which are therefore vertical, the horizontal strips which still have to be produced on the coloured plate are at 90° of the red, green and blue strips, which makes production much more difficult with said printing method.

DESCRIPTION OF THE PREFERRED EMBODIMENTS

Figure 6:
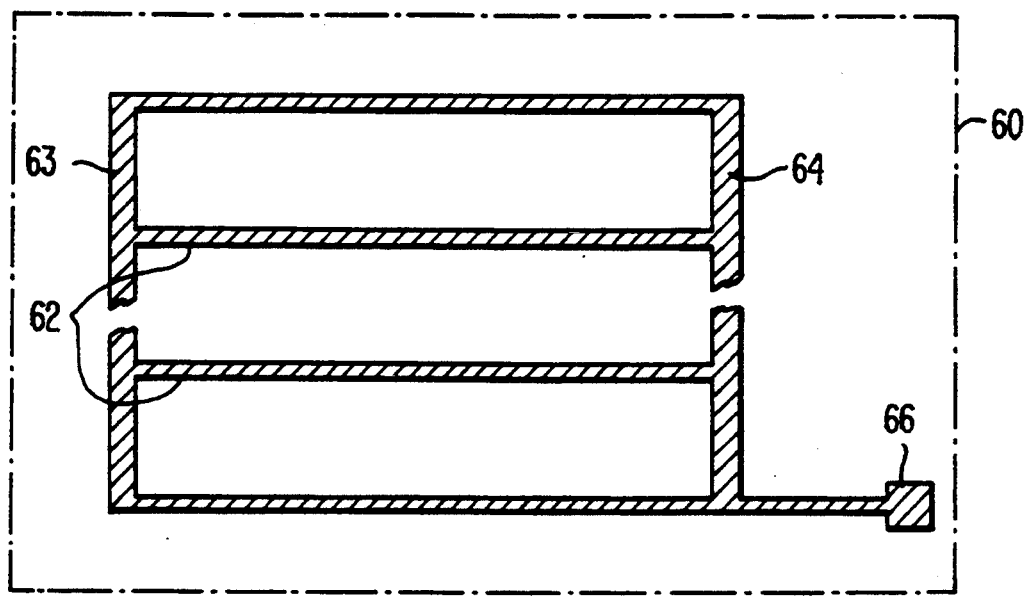
FIG. 6 Shows in plan view an optical mask according to the invention.

FIG. 6 shows a transparent plate 60 (e.g. of glass) on which has been deposited an opaque, conductive material layer. e.g. of chromium, which has then been etched with a pattern having rows 62 connected to two columns 63, 64. The chromium layer can have a thickness of about one hundred nanometers. A contact element 66 is also provided connected to the complete mask.

On said pattern is then deposited a dielectric, insulating layer 68, e.g. of silica, having a thickness of a few hundred nanometers, e.g. 500.

Figure 7A:
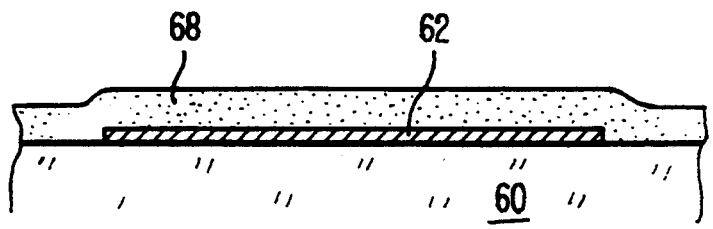
FIGS. 7A and 7B Show said optical mask in longitudinal and transverse sections.
Figure 7B:
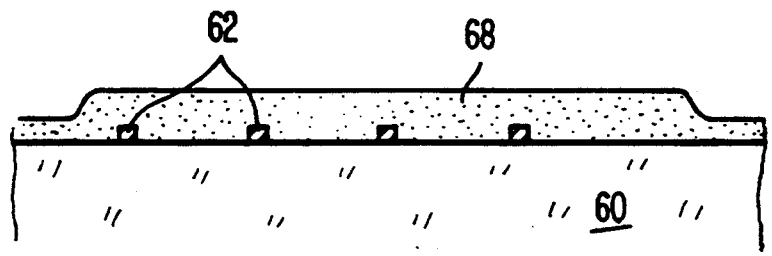

FIG. 7 shows a longitudinal section (part a) along a row 62 and a cross-section (part b) perpendicular to the rows.

On the thus insulated optical mask is produced the array of thin film transistors in the manner described in FR-A-2 833 072. It is pointed out that this process involves two photolithography operations, namely the deposition and then etching of an ITO layer for producing the columns and pixels of the array (and the sources and drains of the transistors) and then the deposition and etching of a stack of three layers (amorphous silicon, silicon nitride and aluminium) in order to form the rows of the array and the transistor gates.

Figure 1:
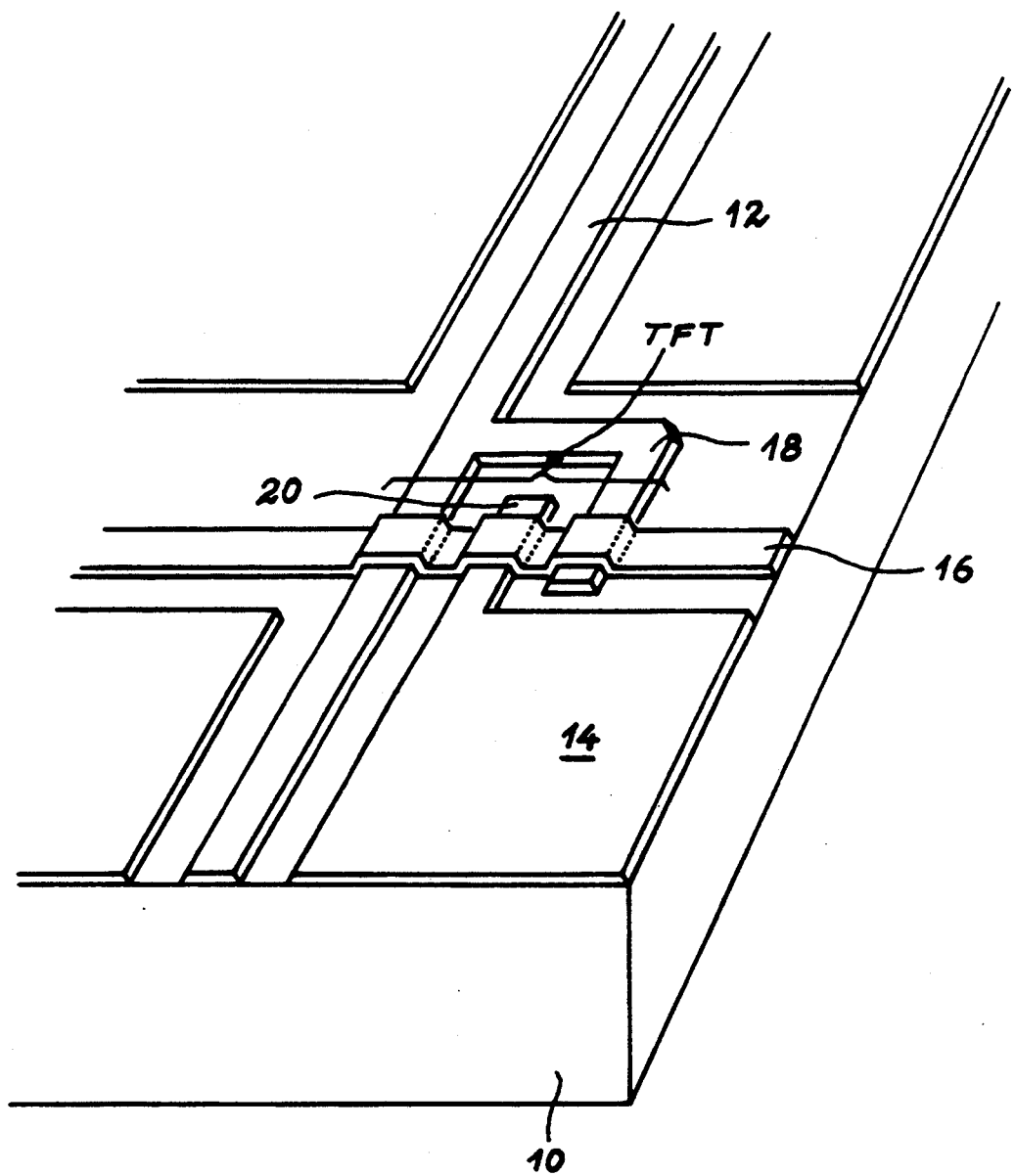
FIG. 1 Already described, shows a first plate of a prior art screen.
Figure 8:
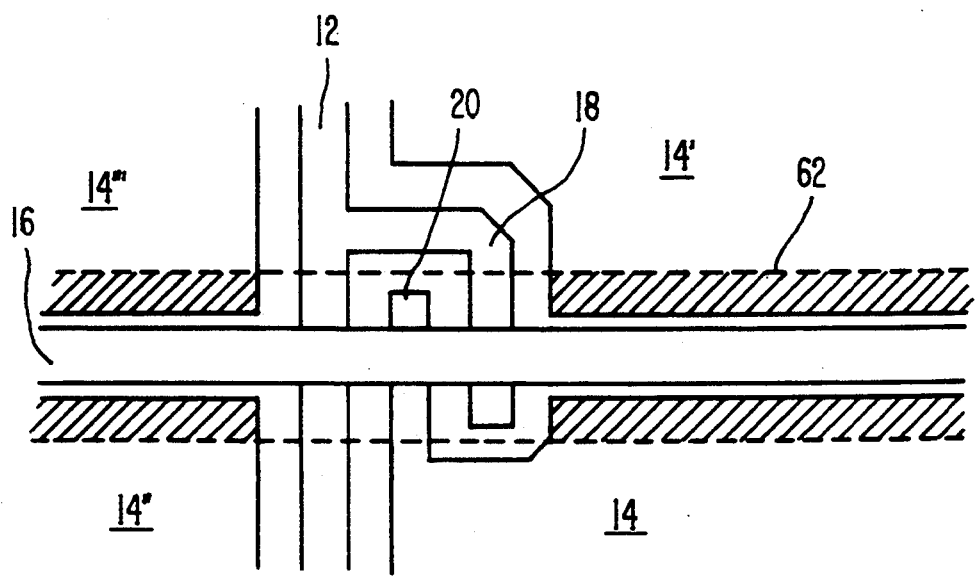
FIG. 8 Shows in plan view an addressing row with its optical mask.
Figure 9A:
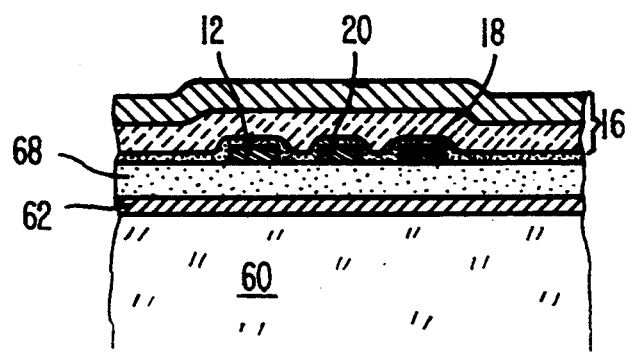
FIG. 9A and 9B Show said addressing row with its mask in longitudinal and transverse sections.
Figure 9B:
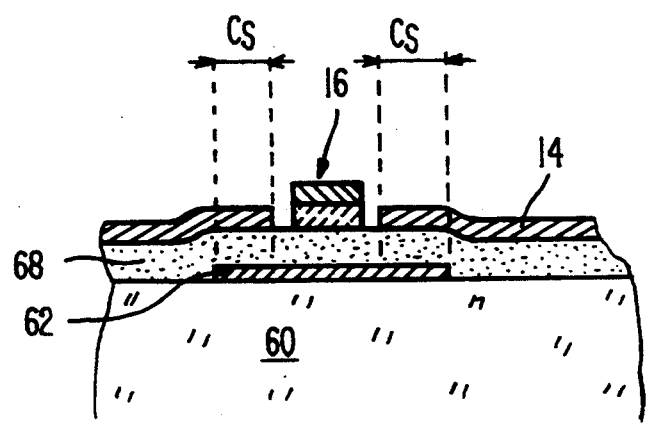

The result obtained is illustrated in plan view in FIG. 8 and in sectional form in FIG. 9, on the one hand along a row of the mask (a) and on the other perpendicular to said row (b). In these two drawings, the elements already shown in FIG. 1 carry the same references, namely 12 for the column, 14 for the electrode, 16 for the addressing row, 18 for the crook connected to the column and 20 for the finger extending the electrode. FIG. 8 more specifically shows the relative width of the rows, the row 62 constituting the optical mask being wider than the addressing row 16 and partly passes below the bordering electrode 14. The partial overlap zone between the electrode 14 and the optical mask row 62 is shown in hatched form. FIG. 8 partly shows four electrodes 14, 14', 14'', 14''' on ,either side of the addressing row. This zone constitutes a storage capacitor, whose function was defined hereinbefore.

FIG. 9 shows a section along a row 62 of the optical mask (part a) and perpendicular to said row (part b). Each mask row passes below the two series of electrodes bordering it in order to create two series of storage capacitors C1.

Figure 2:
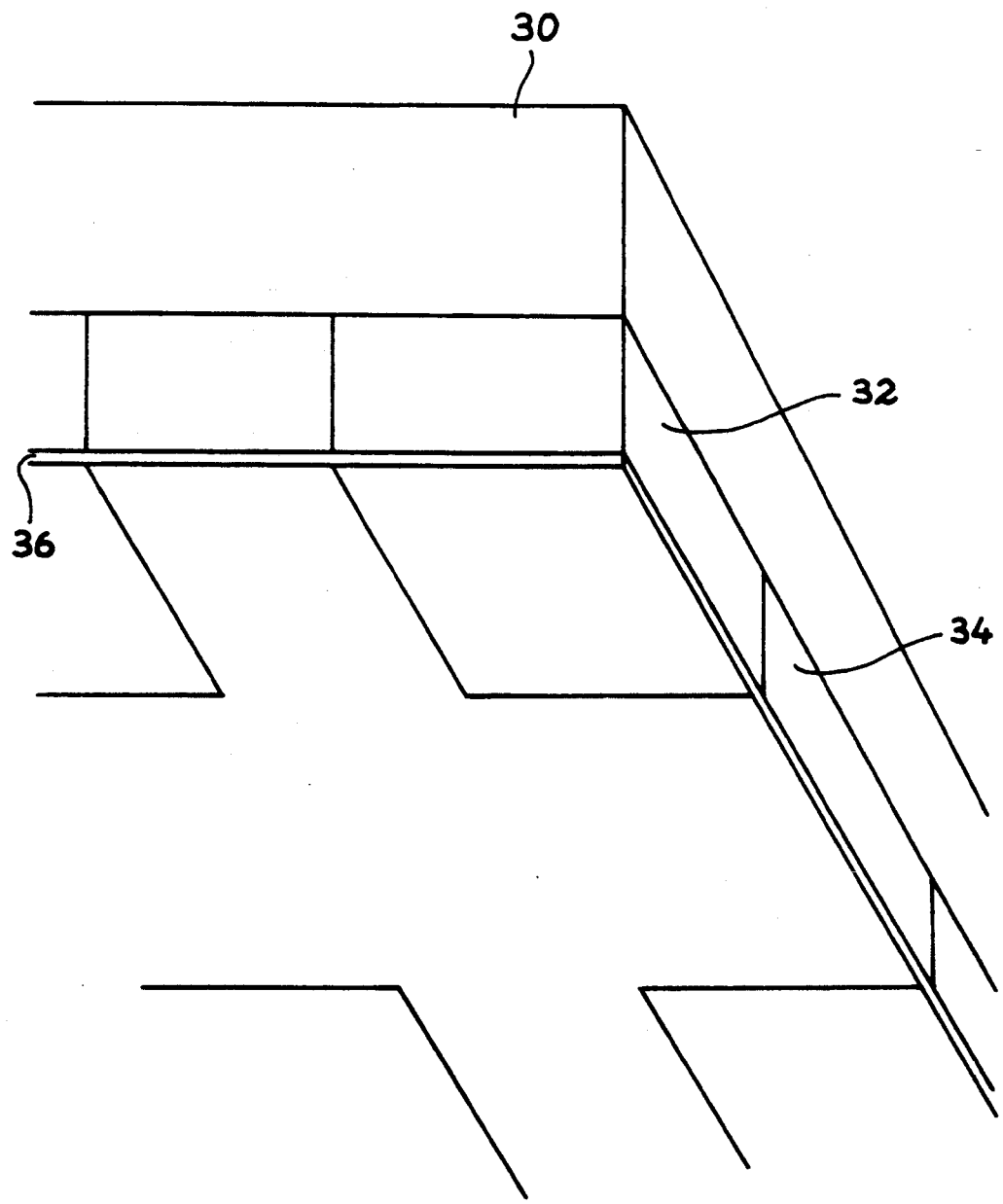
FIG. 2 Already described, shows a second plate according to the prior art.
Figure 3:
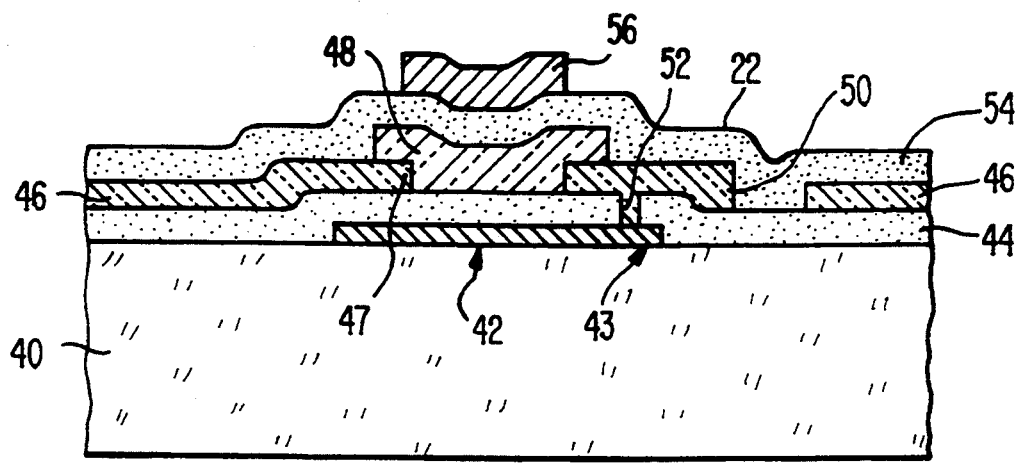
FIG. 3 Already described, shows in section a thin film transistor with an optical mask according to the prior art.
Figure 4:
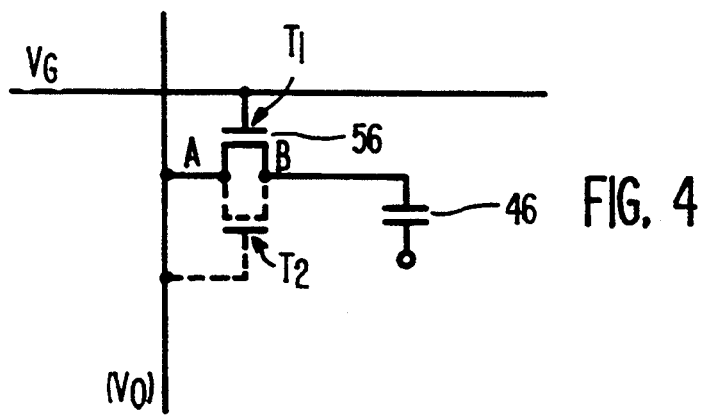
FIG. 4 Already described, shows an equivalent electric circuit.
Figure 5A:
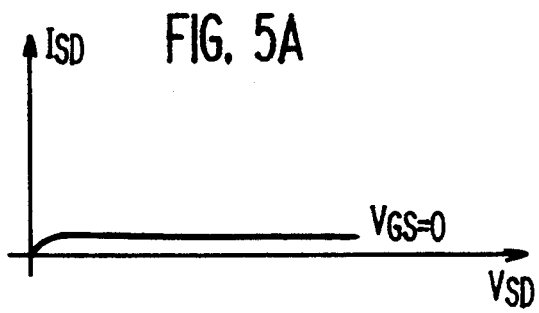
FIG. 5A and 5B Already described, illustrate the operation of this equivalent circuit.
Figure 5B:
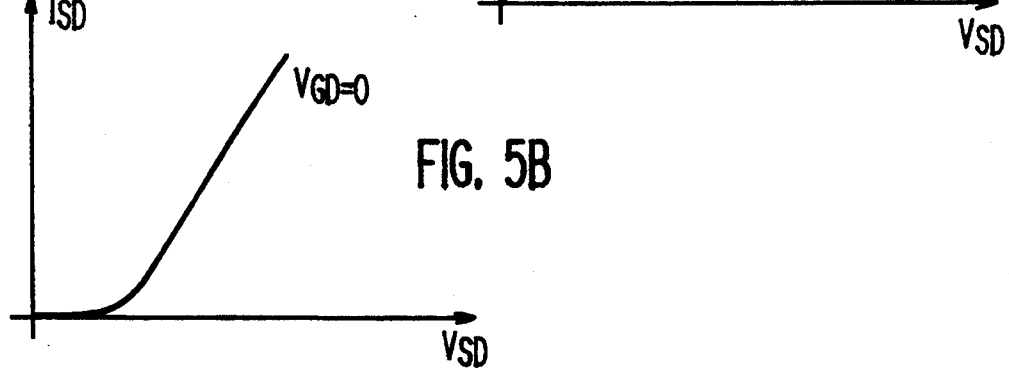

The construction of the complete screen continues by the assembly of the thus produced plate with a coloured filter plate as illustrated in FIG. 2. For this purpose conventional procedures are used for treating the surfaces, depositing spacers, bonding, filling and fitting polarizers. The screen is then connected to peripheral electronic circuits.

We claim:

1. An active-matrix display screen comprising:
    a first plate having a first transparent substrate on which an array of electrodes is formed;
    an array of thin film transistors defined by addressing row and addressing column electrodes for respectively controlling said array of electrodes;
    an optical mask constituted by an opaque film which is provided at least partially below each of said thin film transistors;
    a transparent, dielectric insulating layer which covers said optical mask; and
    a second plate having a second transparent substrate on which a counterelectrode is formed, wherein said optical mask comprises a plurality of opaque conducting rows equal in number to a number of said addressing rows, all of said opaque conducting rows being joined together and connected to an electrode contact to which a reference potential may be applied to raise said optical mask to said reference potential, each of said opaque conducting rows being positioned on said first substrate below said addressing rows and having a width greater than a width of said addressing rows, and wherein at least a portion of each of said opaque conducting rows is positioned directly beneath one of said array of electrodes, each overlap formed thereby constituting a storage capacitor.

2. A display screen according to claim 1, wherein said optical mask comprises two opaque conducting columns which are connected to respective ends of each of said opaque conducting rows.

3. A display screen according to claim 1, wherein said opaque conducting rows of said optical mask are formed of chromium.

4. A display screen according to claim 3, wherein said opaque conducting rows of said optical mask have a thickness of approximately 100 nm.

5. A display screen according to claim 1, wherein said transparent, dielectric insulating layer is formed of silica.

6. A display screen according to claim 5, wherein said transparent, dielectric insulating layer has a thickness of a few hundred nanometers.

7. A method of manufacturing an active-matrix display screen, comprising the steps of:
    (a) forming a first plate by
        (i) forming an optical mask by depositing a thin film of opaque conductive material on a first transparent substrate and etching said opaque conductive material in accordance with a pattern of rows having widths greater than widths of addressing row electrodes to be formed and all of said rows being joined together and connected to an electrical contact;
        (ii) depositing a transparent, dielectric insulating film on said rows of said optical mask;
        (iii) depositing a first transparent, conductive layer on said first transparent, dielectric insulating film;
        (iv) etching said first transparent, conductive layer to form addressing column electrodes, an array of electrodes, and drains and sources of thin film transistors;
        (v) depositing a stack of layers consisting of a semiconductor layer, an insulating layer, and a conducting layer on said first transparent, conductive layer; and
        (vi) etching said stack of layers to form said addressing row electrodes and gates of said thin film transistors;
    (b) forming a second plate by
        (i) depositing on a second transparent substrate a second transparent, conductive layer which serves as a counterelectrode; and
        (ii) forming storage capacitors by positioning at least a portion of each of said rows of said optical mask directly beneath each of said array of electrodes; and (c) assembling said first and second plates.

8. A method according to claim 7, wherein said thin film of opaque conductive material is deposited by cathodic sputtering.

9. A method according to any of claims 7-8, wherein said thin film of opaque conductive material is comprised of chromium.

10. A method according to claim 9, wherein said thin film of opaque conductive material is deposited with a thickness of approximately 100 nm.

11. A method according to claim 10, wherein said transparent, dielectric insulating film is formed of silica.

12. A method according to claim 11, wherein said transparent, dielectric insulating film is deposited with a thickness of a few hundred nanometers.

* * * * *